United States Patent
Lin

[11] Patent Number: 5,192,104
[45] Date of Patent: Mar. 9, 1993

[54] ELONGATED CLAMP

[76] Inventor: Chin-Liang Lin, No. 55,, Chia-Tung Chiao, Chia Fang Li, Hsin-Ying Hsih, Tainan Hsien, Taiwan

[21] Appl. No.: 890,074
[22] Filed: May 29, 1992
[51] Int. Cl.⁵ .............................................. B25J 1/00
[52] U.S. Cl. .................................. 294/19.1; 294/104
[58] Field of Search .................... 294/8.5, 11, 19.1, 22, 294/23, 28, 50.9, 104; 119/151, 154

[56] References Cited

U.S. PATENT DOCUMENTS

| | | | |
|---|---|---|---|
| 872,748 | 12/1907 | Putney | 294/19.1 |
| 1,764,919 | 6/1930 | Weeden | 294/104 |
| 1,914,246 | 6/1933 | Entrikin | 294/19.1 |
| 3,146,015 | 8/1964 | Roberge | 294/19.1 |
| 3,265,429 | 8/1966 | Shatt | 294/19.1 |
| 3,591,226 | 7/1971 | Elmore et al. | 294/19.1 |

FOREIGN PATENT DOCUMENTS

| | | | |
|---|---|---|---|
| 1142678 | 9/1957 | France | 294/19.1 |
| 1273954 | 9/1961 | France | 294/22 |
| 351190 | 10/1937 | Italy | 294/19.1 |
| 176891 | 7/1935 | Switzerland | 294/19.1 |
| 849366 | 9/1960 | United Kingdom | 294/19.1 |
| 2081170 | 2/1982 | United Kingdom | 294/19.1 |

Primary Examiner—Johnny D. Cherry
Attorney, Agent, or Firm—Morton J. Rosenberg; David I. Klein

[57] ABSTRACT

An elongated clamp for holding an object, having a hollow elongated body, a grip fixed with one end of the body, a C-shaped trigger pivotally fixed on the body near the grip, a swingable L-shaped arm having one end pivotally fixed near the other end of the body, a rope stretched between the trigger and the arm and extending along in the body to wind on two roller wheels fixed on the body, the trigger being pulled back manually to pull back the rope, which then pulls the arm to swing toward the body to hold an object between a rugged surface in an end portion of the arm and a rugged surface in a support block fixed in an end portion of the body.

1 Claim, 3 Drawing Sheets

ELONGATED CLAMP

BACKGROUND OF THE INVENTION

This invention concerns an elongated clamp which can catch hold of an object such as a glass, a drug envelope, etc., by a sick person in bed or in a wheel chair who can still use his/her hand to hold this clamp to grasp objects in his/her home, when a nurse or a family member is not around to help him/her.

SUMMARY OF THE INVENTION

The elongated clamp in the present invention comprises a hollow elongated body, a grip fixed with one end of the body, a C-shaped trigger pivotally fixed on the body near the grip to be manually pulled back, a swingable L-shaped arm pivotally fixed on the body near the front end of the body, two roller wheels fixed on the body spaced apart for a rope stretched between the C-shaped trigger and the L-shaped arm to extend to wind on and a support block having a rugged surface fixed in the hollow cavity in an end portion of the body. The L-shaped arm also has an inside rugged surface to face towards the counterpart in the support block so that when the trigger is pulled back, the rope is pulled back at the same time, forcing the arm to swing towards the body so that both the rugged surfaces in the arm and the support block can catch hold of an object between them. And a compress spring is provided to have one end wound around a pinned end of the L-shaped arm and the other end pressing the inner wall of the body to elastically push back the L-shaped arm to an original position when the trigger is loosened after the arm is pulled to swing nearer to the body to catch hold of an object.

BRIEF DESCRIPTION OF DRAWINGS

The invention will be better understood by reference to the accompanying drawings, wherein.

DETAILED DESCRIPTION OF THE PREFERRED EMBODIMENTS

Figure 1:
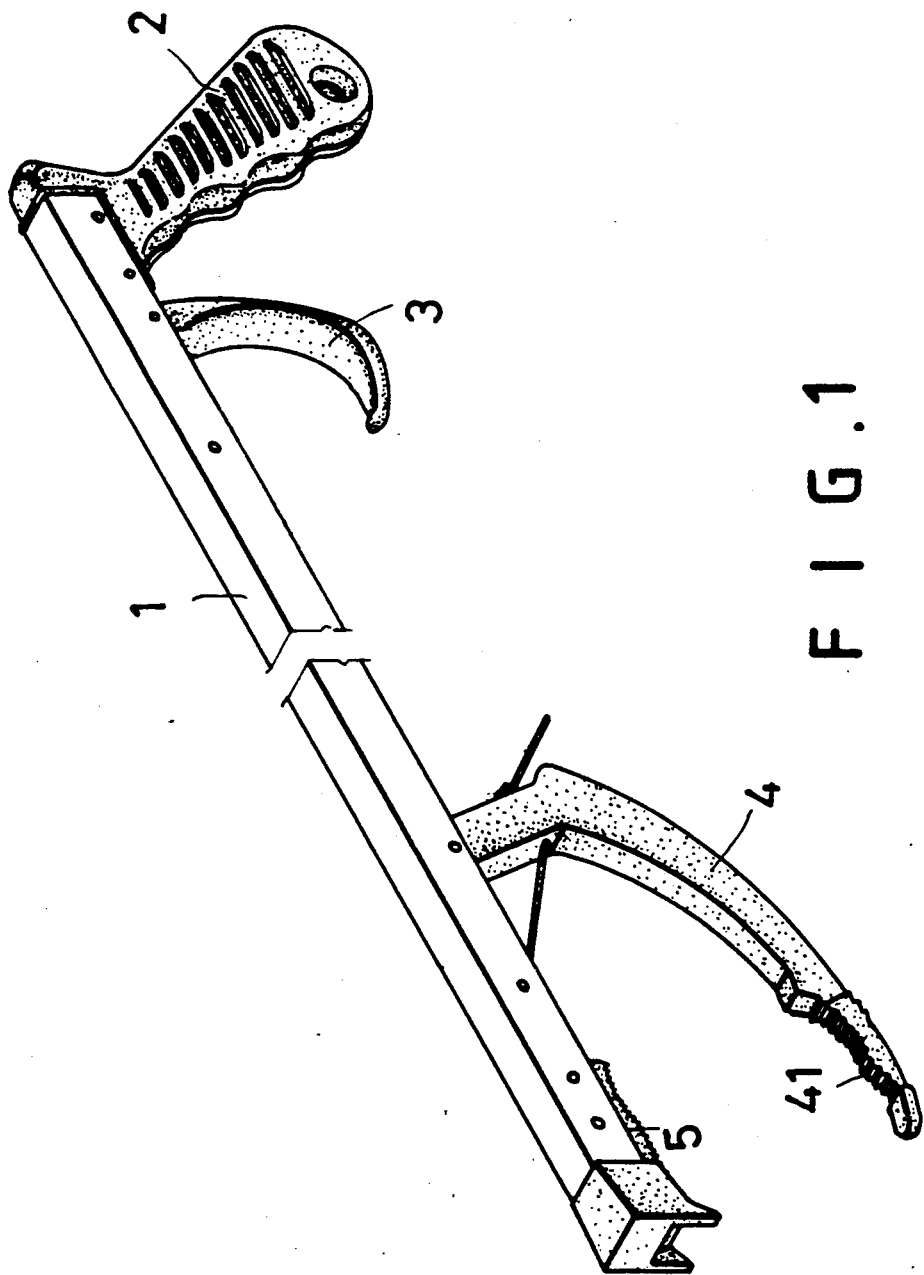
FIG. 1 is a perspective view of the elongated clamp in the present invention.
Figure 2:
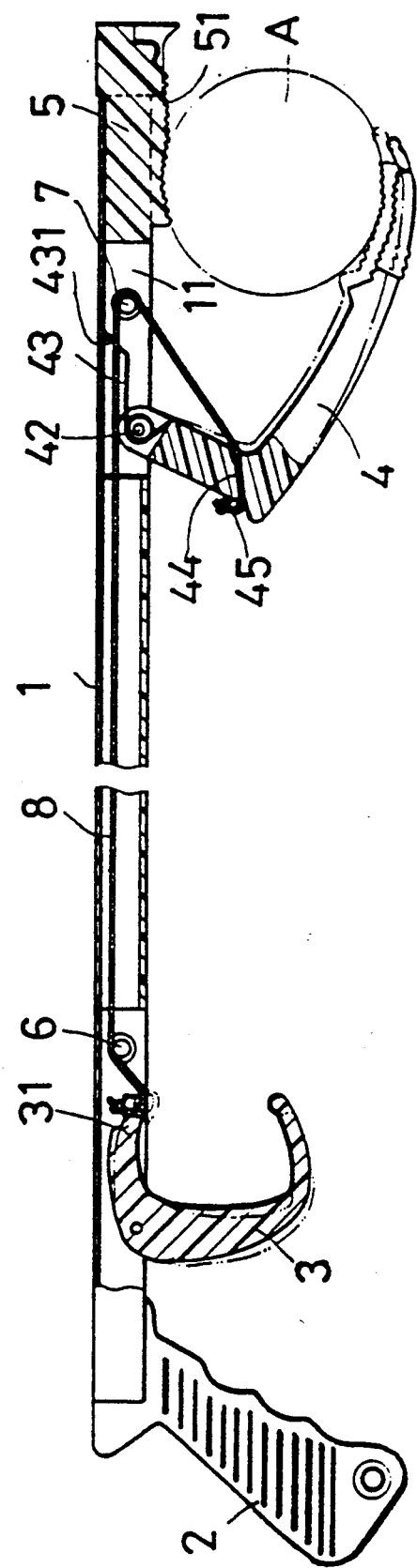
FIG. 2 is a side view of the elongated clamp catching hold of a glass in the present invention; and, FIG. 3 is a side view of the elongated clamp catching hold of a drug envelope in the present invention.

The elongated clamp in accordance with the present invention, as shown in FIGS. 1 and 2, comprises a hollow elongated body 1, a grip 2 inclinedly combined with one end of the body 1, a C-shaped trigger 3 pivotally fixed with an end portion of the body 1 near the grip 2, and a swingable L-shaped arm 4 pivotally fixed with the other end portion of the body 1 as the main components.

The hollow elongated body 1 preferably has a hollow square cross-section and a proper length.

The C-shaped trigger 3 has an upper end 31 bound with one end of a rope 8, which is stretched between the trigger 3 and the L-shaped arm 4, extending inside the body and to slide on two roller wheels 6, 7 fixed crosswise and spaced apart on the body 1 and then passes through a hole 44 bored in the swingable L-shaped arm 4, having the other end fixed with a hook 45 in the arm 4.

The swingable L-shaped arm 4 has an end 42 pivotally fixed with a pin with the body 1, and a rugged surface 41 on a free end and a compress spring 43 is provided to have one of its ends wound around the pinned end 42 and the other end elastically pressing the inner wall of the body 1.

A support block 5 is provided to be fitted in a hollow cavity 11 in one end of the body 1, having a rugged surface 51 for contacting a surface of an object such as a glass, etc, so that the rugged surface 51 together with the rugged surface 41 in the swingable arm 4 can firmly contact on outer surface of something like a glass to catch hold of it.

Figure 3:
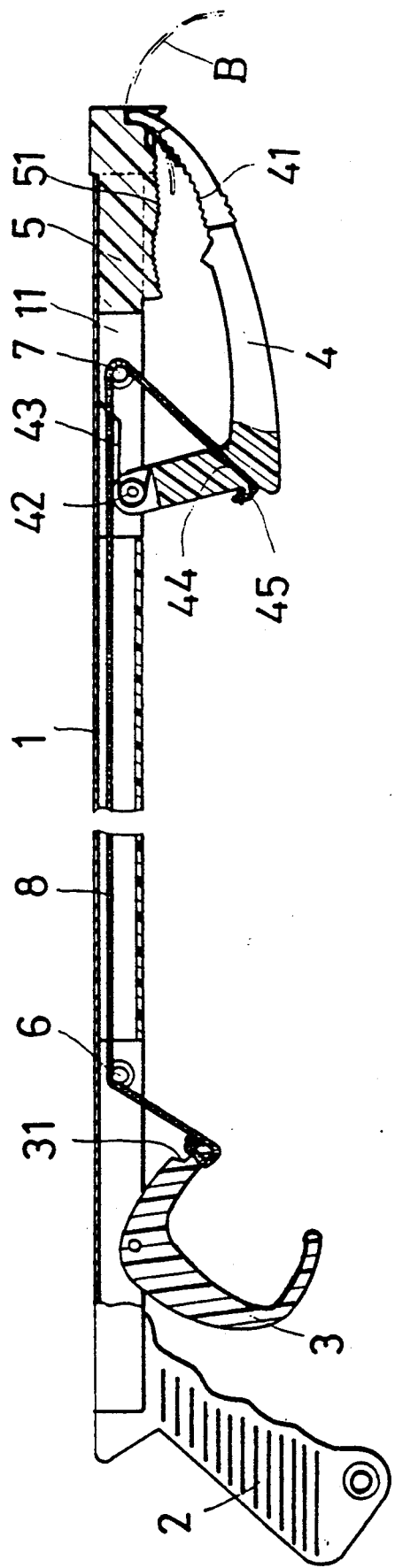

In using this clamp by a sick person who can still use his/her hand to hold this clamp to take something which is beyond reach of his/her hand around him/her, he/she can hold the grip 2 and pulls the trigger 3 back from a position shown in a solid line to a position shown in a dotted line. Then the rope 8 is pulled by the trigger 3, forcing the swingable arm 4 to swing toward the body 1 so that the rugged surface 41 may move from the position shown in a solid line to the position shown in a dotted line in FIG. 2, catching hold of a glass A with the aid of the rugged surface 51 in the support block 5. Another example is shown in FIG. 3, wherein a drug envelope B is caught hold of between both the rugged surfaces 41 and 51, by pulling the trigger further back. Both the rugged surfaces 41 and 51 in the arm 4 and the support block 5 are made of extremely elastic material so as to catch hold of objects steadily and securely between them. Loosening a finger pulling the trigger may let the compress spring 43 automatically push the swingable arm 4 to swing back to the original position shown in a solid line in FIG. 2, allowing the object caught hold of to be loosened off.

While the preferred embodiments of the invention have been described above, it will be recognized and understood that various modifications may be made therein and the appended claims are intended to cover all such modifications which may fall within the spirit and scope of the invention.

What is claimed is:

1. An elongated clamp for releasably gripping an object comprising:
    (a) a hollow elongated housing defining opposing first and second end sections, said hollow elongated housing having a top wall and a pair of opposing sidewalls;
    (b) a grip member fixedly secured to said first end section of said housing;
    (c) a C-shaped trigger member positioned adjacent said grip member, said trigger member being pivotally secured to said opposing sidewalls of said housing within an interior of said hollow elongated housing, said trigger member having one end coupled to a first end of a rope member;
    (d) a substantially L-shaped arm member pivotally secured to said opposing sidewalls adjacent said second end section of said hollow elongated housing, said L-shaped arm member defining a first arm and a second arm, said first arm having a through opening for inserting therethrough a second end of said rope member secured to said first arm by a hook member, said first arm being rotatable about a pin member secured to said opposing housing sidewalls, said second arm having at least a portion thereof forming a serrated surface for contacting said object;

(e) an elastic support block member fixedly secured to said second end section of said housing and at least partially mounted within said hollow elongated housing, said support block member having an inner surface being at least partially serrated for contacting said object;

(f) a pair of rotatable pulley members rotatably secured to said opposing sidewalls of said housing adjacent respectively said first and second end sections of said housing, said rope member passing contiguous said pulley members for coupling said C-shaped trigger member and said L-shaped arm member in a responsive displacement coupling; and, (g) a torsion spring being rotatably mounted substantially interior of said housing on said pin member and having a first end contiguous said top wall of said housing and a second end contiguous an end of said first arm of said L-shaped arm member for biasing said second arm and said support block member in a displaced manner each from the other.

* * * * *